Patented Jan. 18, 1944

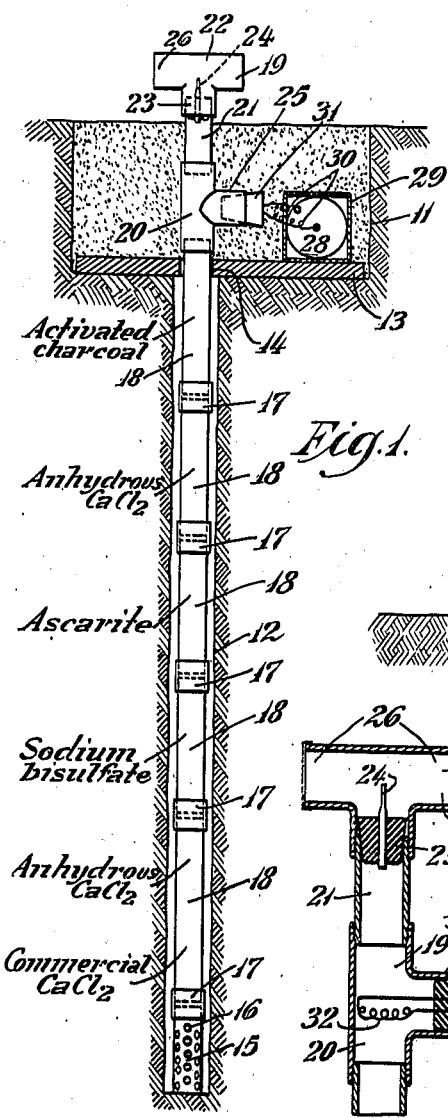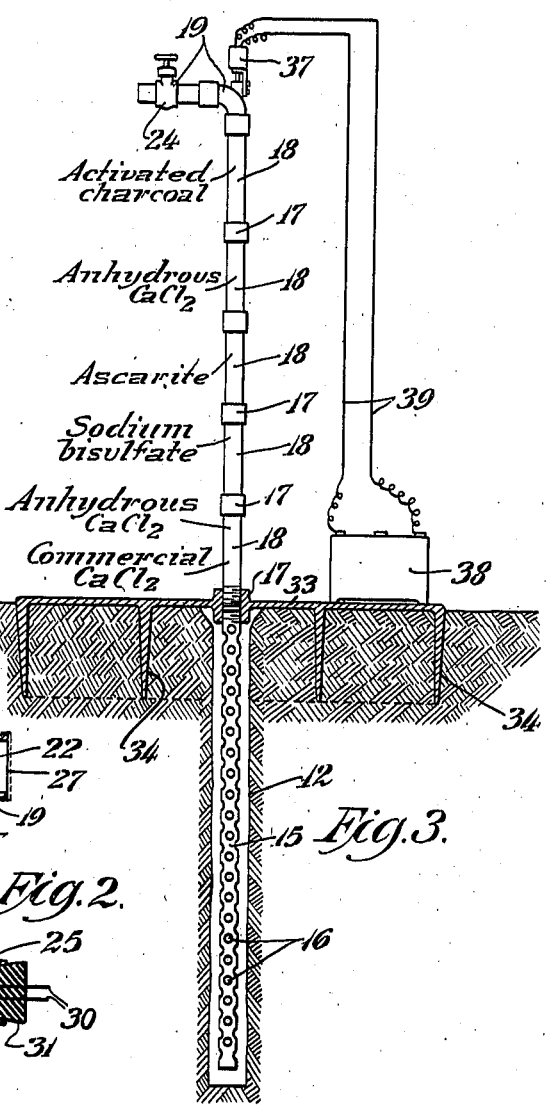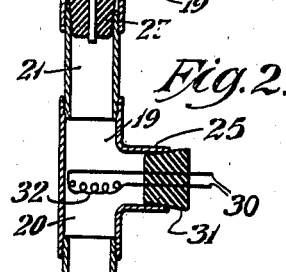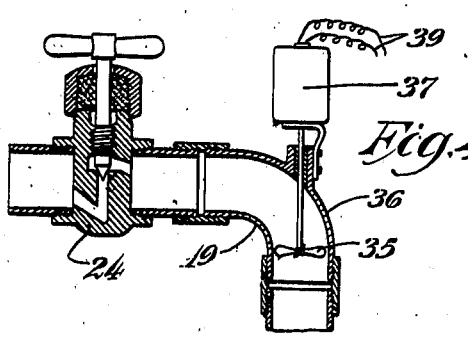

2,339,651

UNITED STATES PATENT OFFICE 2,339,651

GEOCHEMICAL PROSPECTING

Donald S. Rearden and Earl G. Brewster, Los Angeles, and Robert Thomas Sanderson, Sierra Madre, Calif., assignors to Stanolind Oil and Gas Company, Tulsa, Okla., a corporation of Delaware Application February 29, 1940, Serial No. 321,602

5 Claims. (Cl. 23—257)

This invention relates to soil gas analysis and more particularly to soil gas analysis for purposes of geochemical prospecting. Still more particularly it relates to methods for the collection of samples of soil gas hydrocarbons and the like for analysis as a step in the art of geochemical prospecting as well as to apparatus for this purpose.

In recent years increasing attention has been given to the analysis of soils as an aid to the location of deep-seated oil and gas deposits. The theory commonly held is that hydrocarbon materials migrate upward from deep-seated deposits and are held in or sorbed by the soils. Thus, by analysis of these soils for hydrocarbon materials, and in some instances for related materials such as hydrogen, some indication of the presence of deep-seated petroleum deposits can be had.

However, difficulties are encountered in this method of geochemical prospecting due to the fact that the sorptive capacities and retentivities of surface soils vary widely so that in the course of a survey it is difficult to determine whether anomalies are due entirely to sub-surface conditions or whether they are due in whole or in part to differences in the soil samples themselves as to sorptive capacity or retentivity. Furthermore, not only do soils vary markedly in sorptive capacity due to variations in their chemical compositions and physical natures but the concentration of hydrocarbons and other materials in a given soil may also be dependent on the environmental history of the soil which cannot be known with certainty and which may differ from survey station to survey station.

To overcome these difficulties one of us has proposed the use of activated charcoal or other sorbent as a means of collecting soil gas samples. The sorbent is preferably suspended in a container in the ground for a predetermined period of time and then removed for analysis of the sorbed hydrocarbons. This is covered by patent application Serial No. 311,812, filed December 30, 1939, and, as is pointed out therein, it is highly important to protect the hydrocarbon sorbent from various sorbable constituents of the soil gases other than those which it is desired to measure. This is particularly true of water.

While this method of exposing a sorbent to the soil gases in a hole in the ground in a static manner has marked advantages over prior art technique, it is not without disadvantages since it is dependent upon diffusion and incidental, uncontrolled and unstandardized gas circulation due to thermal and other causes. Another disadvantage of this technique is that the amount of water which must be dealt with is very large since the gas in the hole in which the sorbent is suspended is free to circulate back to the soil, picking up more water without picking up any appreciable incremental amount of hydrocarbons so that the amount of water vapor which must be removed per unit amount of hydrocarbon is often very large.

It is an object of our invention to overcome these difficulties and to provide a method of and apparatus for geochemical prospecting which will give more significant and comparable results than the methods and apparatus heretofore used. It is also an object of our invention to provide a particularly convenient method of sample collection in connection with geochemical prospecting. A further object of our invention is to standardize the collection of samples of volatile soil gas components, particularly soil gas hydrocarbons. A still further object of our invention is to provide samples of soil gas hydrocarbons relatively free from contaminating constituents. Still another object is to provide samples of high concentration.

Further objects of our invention include the provision of a rapid method of collecting samples of the type described and the provision of a more completely reproducible and standardizable system of sample collection. Another object of our invention is to minimize the amount of water vapor which must be handled per unit of hydrocarbon sample collected. Other and more detailed objects, advantages and uses of our invention will become apparent as the description thereof proceeds.

In brief we accomplish these objects by placing in a cavity in the soil or in communication with a cavity in the soil a sample collection train having an inlet and an outlet with a provision relatively near the inlet end for removing at least one contaminating impurity, notably water, and a provision relatively near the outlet end for collecting the hydrocarbon sample. Circulation is maintained through this sample collecting train so that the amount of gas passing through it is controllable and so that greater speed of sample collection can be maintained, also so that gases which have once passed through the sample collecting train are discarded and do not pass through it more than once.

It will be apparent that all of this can be accomplished in a considerable variety of ways but it will be described with particular reference to certain preferred embodiments shown in the accompanying drawing which forms a part of this specification and are to be read in conjunction therewith and in which like reference numerals refer to like or corresponding parts.

In the drawing:

Figure 1 is a section through a portion of the earth's crust showing one embodiment of our invention;

Figure 2 is a detail, in sectional elevation, corresponding to the upper end of the apparatus shown in Figure 1;

Figure 3 is an elevation of an alternative form of apparatus for carrying on our invention, showing also a section through a portion of the earth's crust; and Figure 4 is a detail, in sectional elevation, corresponding to the upper end of the apparatus shown in Figure 3.

Turning now to Figures 1 and 2, the apparatus shown is installed by first digging a hole 11 which may be about a foot deep and a foot or two on a side. Then a hole 12 is dug or drilled which may, for instance, be 3 inches in diameter and from 3 to 25 feet deep, for instance 6 or 8 feet deep. In the bottom of hole 11 is placed a board 13 having an aperture 14 through which is inserted a sample collecting train. Looking at this sample collecting train from the bottom it consists of a gas entrance section 15 which may be merely a piece of pipe with holes 16 cut in it to admit the soil gas and lined with wire screen or gauze to keep out soil particles. More elaborate screens or strainers of the types used in water or oil wells can, of course, be used but are not usually required. This gas entrance section 15 is connected by the lowermost of couplings 17 with the lowermost of a series of nipples or pipe sections 18 which are filled with sorbents and which are interconnected by the remainder of couplings 17 as shown. It will be understood that any desired number of these nipples or pipe sections can be used. They may, for example, be made of ordinary 1 inch pipes with each nipple about one foot long.

The sorbent present in one or more of the upper pipe sections, for instance in the uppermost pipe section 18, is a sorbent for hydrocarbons.

Charcoal, activated carbon and similar carbonaceous sorbents commonly known as activated charcoal are preferred but any other material having a high and/or specific sorptive capacity for hydrocarbons, hydrogen, etc., can be used. Commercial activated chacoal is not generally satisfactory as such since it is usually contaminated with non-constant amounts of hydrocarbons or gases which interfere with the hydrocarbon sorption and especially with the subsequent analysis. Commercial activated charcoal must therefore be thoroughly degassed by some such method as prolonged heating at a high temperature in vacuo before it is fit for use as a standard sorbent in accordance with our invention. By way of example, degassing can be carried out by heating the activated charcoal to 600° C. for 10 hours at a pressure of about $10^{-5}$ millimeters of mercury although less vigorous treatment is often entirely sufficient. It is advantageous to heat the charcoal, after brief preliminary evacuation, in an atmosphere of natural (hydrocarbon) gas or other gaseous hydrocarbon or hydrocarbons, before subjecting the charcoal to the rigorous degassing mentioned above. This pretreatment or preliminary sorption of gases the same as or similar to those to be tested results in the displacement of strongly sorbed impurities which may not otherwise be eliminated. After such pretreatment followed by degassing the specific sorptive capacity of the activated charcoal for hydrocarbon gases is higher than it would be if the pretreatment were omitted.

While activated charcoal and similar carbonaceous sorbents, preferably pretreated and degassed as described, are the preferred hydrocarbon sorbents, other solid sorbents can be used, for instance silica gel.

The lower sections of the sample collecting train are utilized to remove contaminating substances which interfere with the hydrocarbon sorption. Most important in this connection is water vapor. As illustrating the importance of the problems introduced by the presence of water vapor in soil gas, an activated charcoal which sorbed 1.15% of its weight of water when exposed to air containing water vapor having a partial pressure of 5.15 millimeters of mercury sorbed 39.33% of water when the partial pressure was 23.76 millimeters of mercury. These differences in water sorption greatly affect the hydrocarbon sorption and thus lead to non-comparable results. On the other hand, this same activated charcoal would sorb only 0.15% of water from air dried over anhydrous or relatively anhydrous calcium chloride and when all samples in a given survey are thus dried before sorption of the hydrocarbons the effect of water becomes completely negligible.

Instead of calcium chloride other desiccants, for instance magnesium perchlorate, can be used.

Accordingly, the lower section or sections of the sample collecting train are filled with a desiccant, for instance the lower end of the lowermost nipple or pipe section 18 can be filled with commercial calcium chloride and the upper end of the same pipe section with anhydrous calcium chloride, the use of the commercial material to remove the bulk of the water being a matter of economy. This calcium chloride section of the train can suitably be somewhat longer than the other sections.

It is also desirable to protect the hydrocarbon sorbent in the uppermost section 18 from basic gases and vapors, particularly ammonia, and from acidic gases and vapors, notably carbon dioxide and also sulfur dioxide. Ammonia and other alkaline or basic gases can be removed by the use of sodium bisulfate and various other acidic sorbents can be used as sorbents for ammonia and other alkaline or basic gases, and a material of this type is accordingly placed in the second from the bottom nipple 18. Similarly Ascarite (a commercial material containing potassium hydroxide and asbestos) or fused potassium or sodium hydroxide or other basic or alkaline sorbent can be used as an acidic gas sorbent. The section of the sample collecting train above the calcium chloride section can thus be filled with sodium bisulfate and the next higher section with Ascarite.

Since the reaction of a basic material such as Ascarite with acidic gases produces water, these must be removed by another section filled with anhydrous calcium chloride or other desiccant (second section 18 from the top).

It will be understood, of course, that both the number and sequence of these sorbent sections can be varied to a considerable extent and also the lengths of the various sections can be varied, depending upon the efficiency of the selective sorbents used and on the amounts of the various substances encountered in the particular type of soil gas which is met with in any particular survey.

In making up the sample collecting train, a weighed amount of a standard sorbent, for instance activated charcoal, is placed in one of pipe sections 18. It may be held in place with glass wool plugs or may be supported on a screen in the pipe section. The section is stoppered tightly at both ends to maintain the condition of the hydrocarbon sorbent until it is ready for use. The other pipe sections are filled with the selective sorbents indicated and may similarly be stoppered while being transported to the point of use. The stoppers are then removed and they are joined together in the proper order over the gas entrance section 15 by means of the couplings 17. The uppermost sorbent section 18 is then attached (after removing the stopper from its lower end) to the lower part of the sample collecting train.

The upper assembly 19 forming the top of the sample collecting train is then put in place. As best shown in Figure 2, this includes a T 20, a short nipple 21 and another T 22. The upper end of nipple 21 carries a rubber stopper 23 in which is a glass tube 24, one end of which is drawn to capillary dimensions. The outlet 25 of T 20 is stoppered at this stage of the procedure with a blank stopper and the outlets 26 of T 22 are preferably permanently covered with wire gauze 27 to prevent intrusion of soil particles. After the upper part of the sample collecting train is assembled, the stopper is removed from the top of the uppermost sorbent section 18 and the upper assembly 19 is screwed in place. Dry cell 28, contained in waterproof case 29, with waterproof insulated leads 30 passing through rubber stopper 31 to heating coil 32, is then put in place on board 13 or above ground if preferred. Outlet 25 of T 20 is unstoppered and the stopper 31 carrying heating coil 32 is then inserted as shown. Soil is now filled in to hole 11 to prevent intrusion of atmospheric air from above the surface of the ground into the sample collecting train. However, T 22 is allowed to project above the surface of the ground or it may be buried a short distance below the surface in which case the soil should not be packed tightly about the upper T 22.

Dry cell 28 heats coil 32 and thus causes thermal convection up through the sample collecting train, drawing soil gas in through gas entrance section 15 and out through capillary 24 and T 22. The circulation is maintained at a low rate, for instance 1 to 10 cubic centimeters of air per minute. The rate selected should in any given instance be as high as possible for practically complete sorption so that the sample collecting operation will not occupy an excessive length of time. However, there is nothing to be gained by passing the gas through the device so rapidly that sorption is incomplete and in fact to do so makes the results unreliable. The ordinary dry cell of the 1.5 volt, 30 ampere-hour type will raise the temperature of 100 cubic centimeters of air by 5° centigrade for about 2000 hours so that any reasonable length of sample collecting time can be used. In general this time should be sufficient to pass a volume of gas equal to at least several times the total volume of hole 12 through the sample collecting train. Sample collecting times ranging from a few days to a few weeks can be used and even shorter times can be used, particularly with the apparatus shown in Figure 3.

Turning now to Figures 3 and 4 we see a form of apparatus for use in our invention which differs from that of Figures 1 and 2 in several respects. In Figure 3 the gas entrance section 15 is extended practically throughout the length of hole 12 and the collecting train extends largely above the surface of the ground. One of couplings 17 (as shown, the lowermost one) carries a sealing device which may consist of a plate 33 with one or more cylindrical downward projections 34 which serve to seal the hole 12 from the atmospheric air.

The device of Figures 3 and 4 also differs from that of Figures 1 and 2 in that in place of circulation being induced by an electrical heating coil, it is induced by a small fan 35 which may be carried by elbow 36 and which is operated by a very small electrical motor 37 which can be run by a battery of dry cells or by a small storage battery 38 with which it is connected by leads 39. This gives somewhat greater and more controllable circulation than does the heating coil of Figures 1 and 2.

Also in place of capillary 24 of Figures 1 and 2, we have provided a needle valve 24 which together with fan 35 serves to control the amount of gas passing through the sample collecting train. This amount of gas should, of course, be standardized for any given series of samples and the apparatus can readily be calibrated so that for a given sorbent train, fan speed and valve opening the rate of gas circulation will be the desired standard value or the gas actually drawn through the apparatus during the sampling operation can be metered.

In the course of geochemical prospecting operations, the sample collecting process above described is, of course, carried out for each of a considerable number of survey stations located at suitably spaced points, for instance every one-tenth mile along a survey line or over a survey area. The sorbents for hydrocarbons collected at each survey station are transported to a laboratory where the hydrocarbons of interest, notably gaseous hydrocarbons heavier than methane, and also any other substances which may be of interest, for instance hydrogen, can be removed by methods normally including the use of heat and vacuum. They can then be analyzed by any of a variety of procedures known to the art.

In collecting the samples in a given survey, it is, of course, highly desirable that everything possible be standardized so that the results will be strictly comparable and therefore indicative of deep-seated oil and gas deposits underlying the soils from which the samples are collected. Thus, for instance, the amount, nature and physical condition of the sorbents used, and particularly the sorbent for hydrocarbons, should be carefully standardized. The nature of the holes and the arrangement of the sample collecting apparatus should be identical and the rate of passage of the soil gas through the sample collecting train should, as previously pointed out, be standardized.

The results of a survey of this type, i. e., relative quantities of one or more hydrocarbons for each of a series of survey stations, can be compared by inspection or mapped in order to determine the presence or possible presence of underlying deep-seated oil or gas deposits. Such deposits may be located directly below or below and slightly offset horizontally from the regions of high hydrocarbon values.

Having described our invention what we desire to claim is:

1. Apparatus for sorbing soil gases from a gas-collecting zone comprising a conduit made up in a plurality of separable sections, one terminal section of said conduit being adapted for disposition entirely within said zone and to collect the soil gases therefrom, means associated with the conduit for sealing the gas-collecting zone from the atmosphere when said terminal section is disposed in said zone, at least one of the sections of the conduit near said terminal section containing a solid soil gas purification reagent, one of the other sections, further removed from said terminal section, containing a sorbent for soil gas, means for separately maintaining the reagent and sorbent in their respective sections, and means disposed in said conduit for inducing positive flow of soil gas from said zone, through said terminal section, the solid soil gas purification agent, the sorbent for soil gases and to the atmosphere.

2. Apparatus as claimed in claim 1 in which said flow-inducing means comprises an electrical resistance heated by a battery.

3. Apparatus for sorbing soil gases from a gas-collecting zone comprising a conduit made up in a plurality of separable sections, one terminal section of said conduit being adapted for disposition entirely within said zone and to collect the soil gases therefrom, means associated with the conduit for sealing the gas-collecting zone from the atmosphere when said terminal section is disposed in said zone, at least two of the sections near said terminal section containing respectively a sorbent for acidic gases and a desiccant, one of the other sections, further removed from said terminal section, containing a sorbent for soil gases, means for separately maintaining the sorbents and desiccant in their respective sections, and means disposed in said conduit for inducing a positive flow of soil gas from said zone, through said terminal section, the sorbent for acidic gases and the desiccant, the sorbent for soil gases and to the atmosphere.

4. Apparatus for sorbing soil gases from a gas-collecting zone comprising a conduit made up in a plurality of separable sections, one terminal section of said conduit being adapted for disposition entirely within said zone and to collect the soil gases therefrom, means associated with the conduit for sealing the gas-collecting zone from the atmosphere when said terminal section is disposed in said zone, at least two of the sections near said terminal section containing respectively a sorbent for basic gases and a desiccant, one of the other sections further removed from said terminal section, containing a sorbent for soil gases, means for separately maintaining the sorbents and desiccant in their respective sections, and means disposed in the said conduit for inducing a positive flow of soil gas from said zone through said terminal section, the sorbent for basic gases and the desiccant, the sorbent for soil gases and to the atmosphere.

5. Apparatus for sorbing soil gases from a gas-collecting zone comprising a conduit made up in a plurality of separable sections, one terminal section of said conduit being adapted for disposition entirely within said zone and to collect the soil gases therefrom, means associated with the conduit for sealing the gas-collecting zone from the atmosphere when said terminal section is disposed in said zone, the separable sections of the conduit containing respectively a desiccant, a selective sorbent for basic gases, a basic sorbent for acidic gases, a desiccant, and sorbent for hydrocarbon soil gases, said first-mentioned desiccant being nearest said terminal section and the sorbent for hydrocarbon soil gases being further removed from said terminal section, means for separately maintaining the sorbents and desiccants in their respective sections, and means disposed in said conduit for inducing a positive flow of soil gas from said zone, through said terminal section and thence in order through the first-mentioned desiccant, the selective sorbent for basic gases, the basic sorbent for acidic gases, the second-mentioned desiccant, the sorbent for hydrocarbon soil gases and thence to the atmosphere.

DONALD S. REARDEN.
EARL G. BREWSTER.
R. THOMAS SANDERSON.